(12) United States Patent
Dahlhaug

(10) Patent No.: US 8,616,833 B2
(45) Date of Patent: Dec. 31, 2013

(54) METHOD AND DEVICE FOR COUNTERACTING WEAR AND TEAR AROUND A GUIDE VANE

(75) Inventor: Ole Gunnar Dahlhaug, Trondheim (NO)

(73) Assignee: Dynavec AS (NO)

( * ) Notice: Subject to any disclaimer, the term of this patent is extended or adjusted under 35 U.S.C. 154(b) by 0 days.

(21) Appl. No.: 13/384,114

(22) PCT Filed: Jul. 9, 2010

(86) PCT No.: PCT/NO2010/000277
§ 371 (c)(1),
(2), (4) Date: Jan. 23, 2012

(87) PCT Pub. No.: WO2011/008105
PCT Pub. Date: Jan. 20, 2011

(65) Prior Publication Data
US 2012/0121386 A1 May 17, 2012

(30) Foreign Application Priority Data
Jul. 14, 2009 (NO) .................................... 20092663

(51) Int. Cl.
*F03B 3/18* (2006.01)
(52) U.S. Cl.
USPC ............................ 415/115; 415/160; 415/165
(58) Field of Classification Search
USPC ................... 415/115, 116, 160, 165
See application file for complete search history.

(56) References Cited

U.S. PATENT DOCUMENTS

| | | | | |
|---|---|---|---|---|
| 2,803,428 A | * | 8/1957 | Garnett | 415/115 |
| 3,360,238 A | * | 12/1967 | Koeller et al. | 415/175 |
| 4,203,703 A | | 5/1980 | Koeller | |
| 4,277,221 A | * | 7/1981 | Kanger | 415/160 |
| 4,692,090 A | * | 9/1987 | Naka | 415/112 |
| 4,861,228 A | * | 8/1989 | Todman | 415/115 |
| 2011/0014049 A1 | * | 1/2011 | Dahlhaug | 416/174 |
| 2012/0121386 A1 | * | 5/2012 | Dahlhaug | 415/121.3 |
| 2012/0121387 A1 | * | 5/2012 | Dahlhaug | 415/121.3 |

FOREIGN PATENT DOCUMENTS

| | | | | |
|---|---|---|---|---|
| DE | 1224219 B | 1/1966 | | |
| FR | 1182583 A | 6/1959 | | |
| NO | 328395 B1 | 9/2009 | | |
| SE | 88257 C | 5/1937 | | |
| WO | WO 2009088299 A2 | * | 7/2009 | F03B 3/18 |

OTHER PUBLICATIONS

Written Opinion issued in connection with PCT/NO2010/000277.

* cited by examiner

*Primary Examiner* — Edward Look
*Assistant Examiner* — Christopher R Legendre
(74) *Attorney, Agent, or Firm* — Akerman LLP

(57) ABSTRACT

A method and a device to counteract wear about a guide vane (16) from a particle bearing drive water, the guide vane (16) being arranged in a guide vane housing (14) in a water turbine (1), and where the method comprises: —routing a supply channel (36) for water cleaner than the drive water to the attachment point area between the guide vane (16) and the guide vane housing (14); and—leading water cleaner than the drive water to flow through a slit (28) where the slit (28) at least partly encircles the guide vane (16).

8 Claims, 3 Drawing Sheets

METHOD AND DEVICE FOR COUNTERACTING WEAR AND TEAR AROUND A GUIDE VANE

This application is a national phase of PCT/NO2010/000277, filed Jul. 9, 2010, and claims priority to NO 2009 2663, filed Jul. 14, 2009, the entire contents of both of which are hereby incorporated by reference.

This invention relates to a method for counteracting wear around a guide vane. More particularly it concerns a method for counteracting wear around a guide vane from particle bearing drive water, the guide vane being arranged in a water turbine. The invention also comprises a device for performing the method.

By drive water is in this context meant water flowing through the turbine for, by pressure drop, handing over energy in the turbine.

Water turbines are exposed to wear from water flowing through the turbine. Turbines being fed river water are typically worn considerably more than turbines being fed water from a reservoir. The reason is that river water may contain considerable amounts of sand.

Even if wear problems more or less relates to all types of turbines, Francis turbines are particularly exposed. Francis turbines are often designed with fairly fine slits in seals between rotary and stationary components.

It has also turned out that considerable wear may occur at the fastening points between fixedly interconnected components. Even a relatively small wear in flow paths or seals will entail a considerable increase in turbulence and water leaks with appurtenant reduction in efficiency.

The object of the invention is to remedy or reduce at least one of the disadvantages of the prior art.

The object is achieved in accordance with the invention by virtue of the features disclosed in the following description and in the subsequent claims.

There is provided a method for counteracting wear around a guide vane from particle bearing drive water, the guide vane being arranged in a guide vane housing in a water turbine, as the method is characterised by comprising:
 routing a supply channel for water cleaner than the drive water to the fastening area between the guide vane and the guide vane housing; and
 leading water cleaner than the drive water to flow through a slit where the slit at least partly encircles the guide vane.

By supplying cleaner water to the area around the guide vane, the clean water may occupy room and thereby affect that particle bearing drive water to a lesser extent comes into contact with the exposed areas.

The method may be performed by means of a device to counteract wear around a guide vane from a particle bearing drive water, the guide vane being arranged in a guide vane housing in a water turbine, as the device is characterised in that a supply channel for water cleaner than the drive water is conveyed to a slit at least encircling the guide vane.

The slit may be comprised by an annulus between the guide vane shaft and the guide vane housing or between the guide vane shaft and a guide vane bushing.

This slit is particularly prone to wear from particle bearing water, and experience shows that wear between the guide vane and the guide vane housing may result in considerable reductions in efficiency and in addition problems in being able to shut off the water flow through the turbine.

The supply channel may be arranged in the guide vane or in the guide vane housing.

The method and the device according to the invention make protection of vital components possible in a reaction turbine from impure drive water and prolongs the useful life of the components considerably.

In the following is described an example of a preferred method and embodiment illustrated in the accompanying drawings, wherein.

Figure 1:
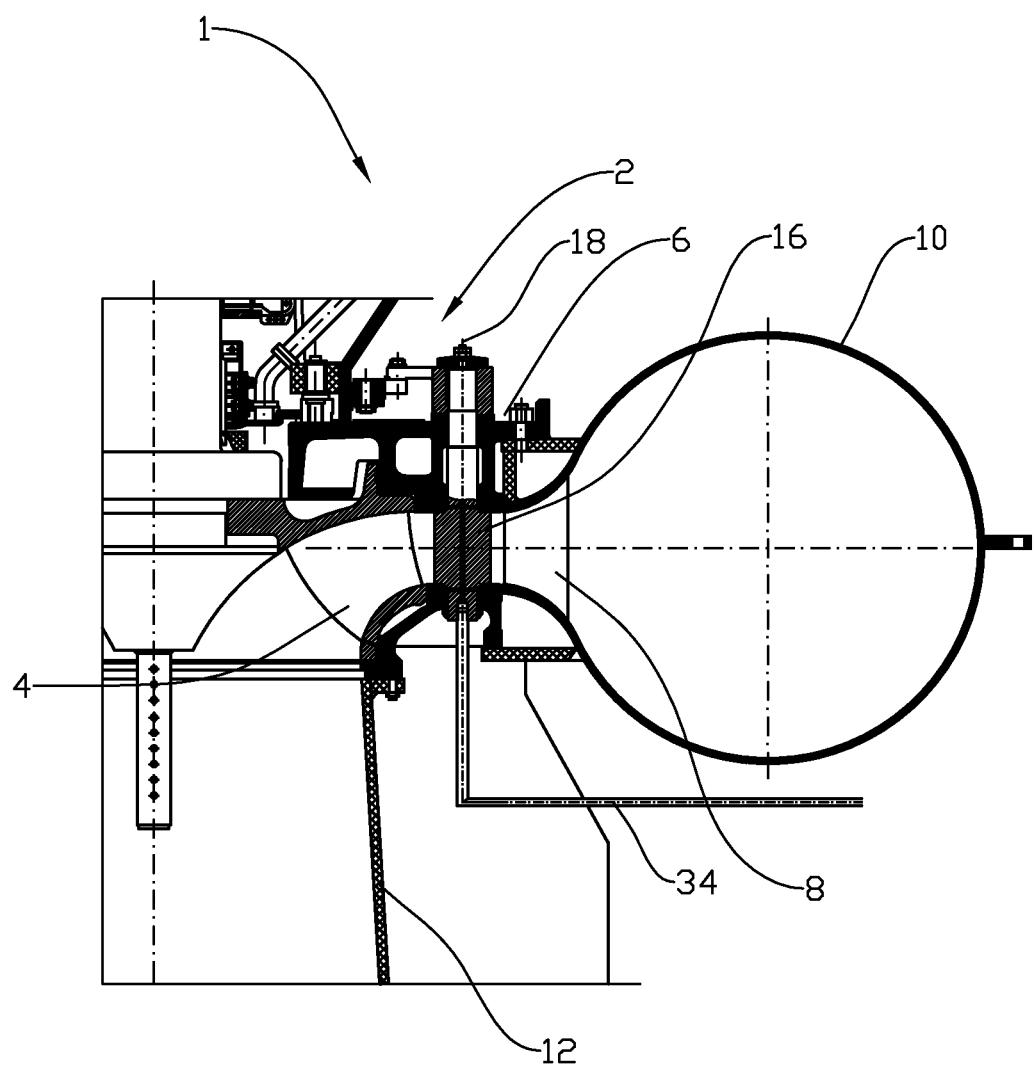
FIG. 1 shows a section of a water turbine provided with a supply channel of the invention.

In the drawing the reference numeral 1 indicates a water turbine of a per se known embodiment comprising a turbine housing 2 and a runner 4.

The turbine housing 2 is put together of a guiding apparatus 6 encircling the runner 4; a stay ring 8 and a spiral drum 10 encircling the guiding apparatus 6. The outlet of the turbine housing 2 is connected to a suction pipe 12.

The guiding apparatus 6 comprises in addition to a guide vane housing 14 a number of guide vanes 16 distributed in the guide vane apparatus 6. The actuators of the guide vanes 16 are not shown.

The guide vane housing 14 is a part of an upper cover 17a and a lower cover 17b.

The guide vanes 16 are arranged to rotate about their longitudinal axis to be able to control the drive water flow through the water turbine 1.

Figure 2:
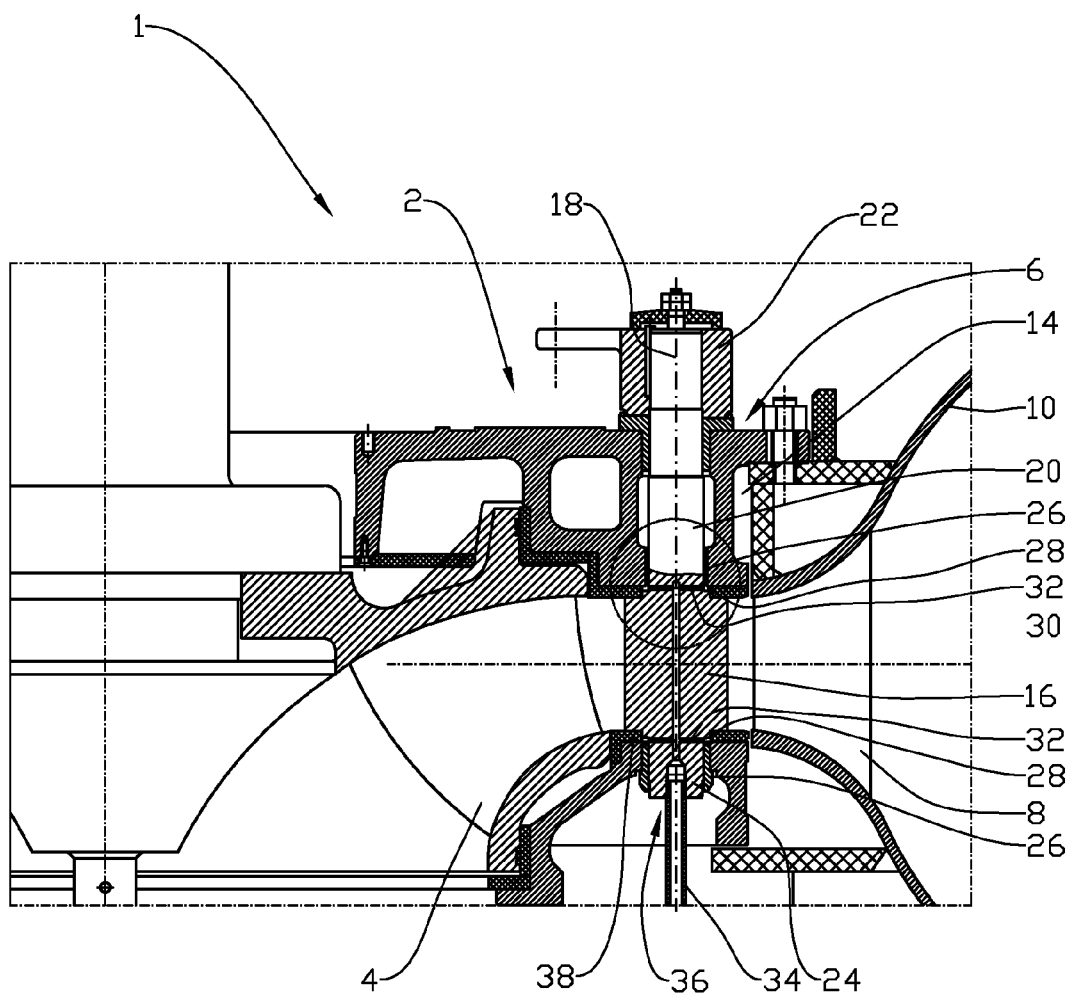
FIG. 2 shows in a larger scale an extract from FIG. 1.
Figure 2A:
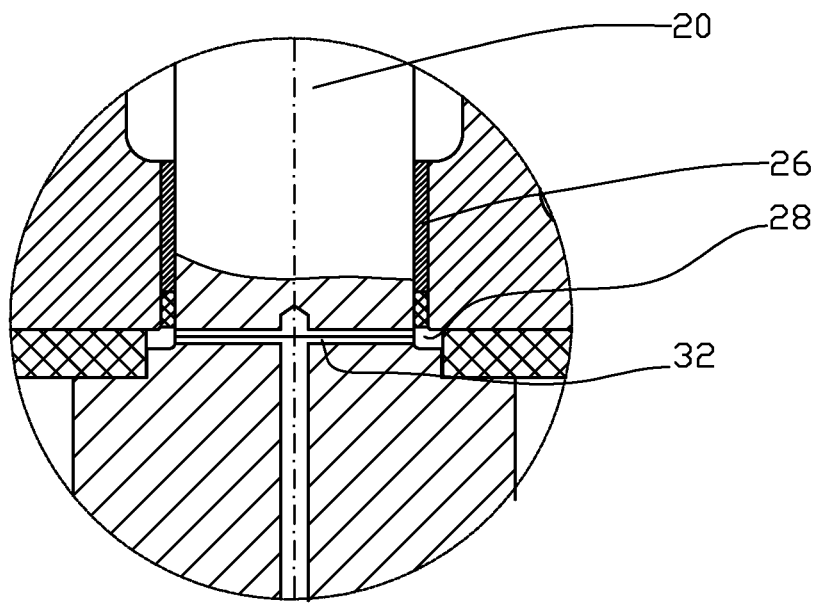
FIG. 2a shows an enlarged view of a part of the water turbine device of FIG. 2.

The guide vane 16 comprises an upper shaft 20 connected to a hub 22, and a lower shaft 24, see FIG. 2. The hub 22 is arranged to be able to be connected to the not shown guide vane actuator.

The shafts 20, 24 are sealingly arranged in bearings 26 in the guide vane housing 14. Between the guide vane housing 14 and the guide vane 16 an annulus in the form of a slit 28 is formed at each of the shafts 20, 24.

A bore 30 runs through the lower shaft 24 and into the guide vane 16. A lateral bore 32 runs from the bore 30 to each of the slits 28.

A supply pipe 34 is connected to the bore 30 and forms together with the bore 30 and the lateral bore 32 a supply channel 36.

During operation of the water turbine 1 water cleaner than the drive water is led into the slits 28 at an adequate pressure via the supply channel 36, i.e. the supply pipe 34, the bore 30 and the lateral bore 32.

The cleaner water flows through the slits 28 into the guide apparatus 6 whereby the particle bearing drive water is essentially prevented from penetrating into the slit 28.

In an alternative embodiment the guide vane housing 14 may be designed having a guide vane bushing 38 between the guide vane housing 14 and the guide vane 16 whereby the slits 28 are between the guide vane 16 and the guide vane bushing 38.

The cleaner water may for example be cleaned water from the same source as the drive water, or may come from a different source.

The invention claimed is:

1. A method to counteract wear about a guide vane in a water turbine caused by turbine driving water containing particles, the guide vane being arranged in a guide vane housing of the water turbine, and a vane supporting shaft located respectively at either end of the vane to form an upper shaft and a lower shaft, respectively, the method comprising:
 providing a water supply of cleaned water or water having a lower particle content than that of turbine driving water, and delivering the water from said water supply to an annular slit surrounding the upper shaft and the lower shaft, respectively, at a transition region between the respective shaft and the vane, the water passage to said slit being provided via a water supply pipe in engagement with the lower shaft and an axial bore extending through the lower shaft and the vane, and at said transition region from said axial bore into a lateral, radial bore extending through the upper shaft and the lower shaft, respectively, at said transition region, the water thereby being delivered to the annular slit via said radial bore.

2. The method according to claim 1, wherein the water is delivered to the annular slit which at said respective transition region is located between the shaft of the guide vane and the guide vane housing.

3. The method according to claim 1,
   wherein the guide vane housing includes a guide vane bushing between the guide vane housing and the guide vane, and
   wherein the water is delivered to the annular slit which at said respective transition region is located between the shaft of the guide vane and the guide vane bushing.

4. The method according to claim 1, wherein a) the water is delivered, at an upper one of the transition regions between the upper shaft and the vane, to a slit thereat which is located between the shaft of the guide vane and the guide vane housing, and
   wherein b) the guide vane housing, at a lower one of the transition regions between the vane and the lower shaft, includes a guide vane bushing between the guide vane housing and the guide vane, such that water is delivered to the annular slit thereat which is located between the shaft of the guide vane and the guide vane bushing.

5. A device in a water turbine to counteract wear about a guide vane in the water turbine from turbine driving water containing particles, the guide vane being arranged in a guide vane housing of the water turbine, and a vane supporting shaft located respectively at either end of the vane to form an upper shaft and a lower shaft, respectively, the device comprising:
   an annular slit surrounding the upper shaft and the lower shaft, respectively, at a transition region between the respective shaft and the vane,
   a water supply channel for supplying cleaned water or water having a particle content lower than that of the turbine driving water, the water supply channel comprising a water supply pipe in engagement with the lower shaft and in communication with an axial bore extending through the lower shaft, the vane and ending at said transition region of the upper shaft, and
   a transverse or lateral, radial bore extending through the upper shaft and the lower shaft, respectively, at said transition region, the radial bore serving to let the axial bore communicate with the annular slit.

6. The device according to claim 5, wherein the annular slit at said respective transition region is located between the shaft of the guide vane and the guide vane housing.

7. The device according to claim 5, wherein the guide vane housing includes a guide vane bushing between the guide vane housing and the guide vane, and
   wherein the annular slit at said respective transition region is located between the shaft of the guide vane and the guide vane bushing.

8. The device according to claim 5, wherein a) the annular slit, at an upper one of the transition regions between the upper shaft and the vane, is located between the shaft of the guide vane and the guide vane housing,
   wherein b) the guide vane housing, at the transition region between the vane and the lower shaft, includes a guide vane bushing between the guide vane housing and the guide vane, the annular slit at said lower transition region being located between the shaft of the guide vane and the guide vane bushing.

* * * * *